July 27, 1943.　　　R. C. MARSH　　　2,325,144
DYNAMIC BALANCING MACHINE
Filed Dec. 13, 1940　　　2 Sheets-Sheet 1
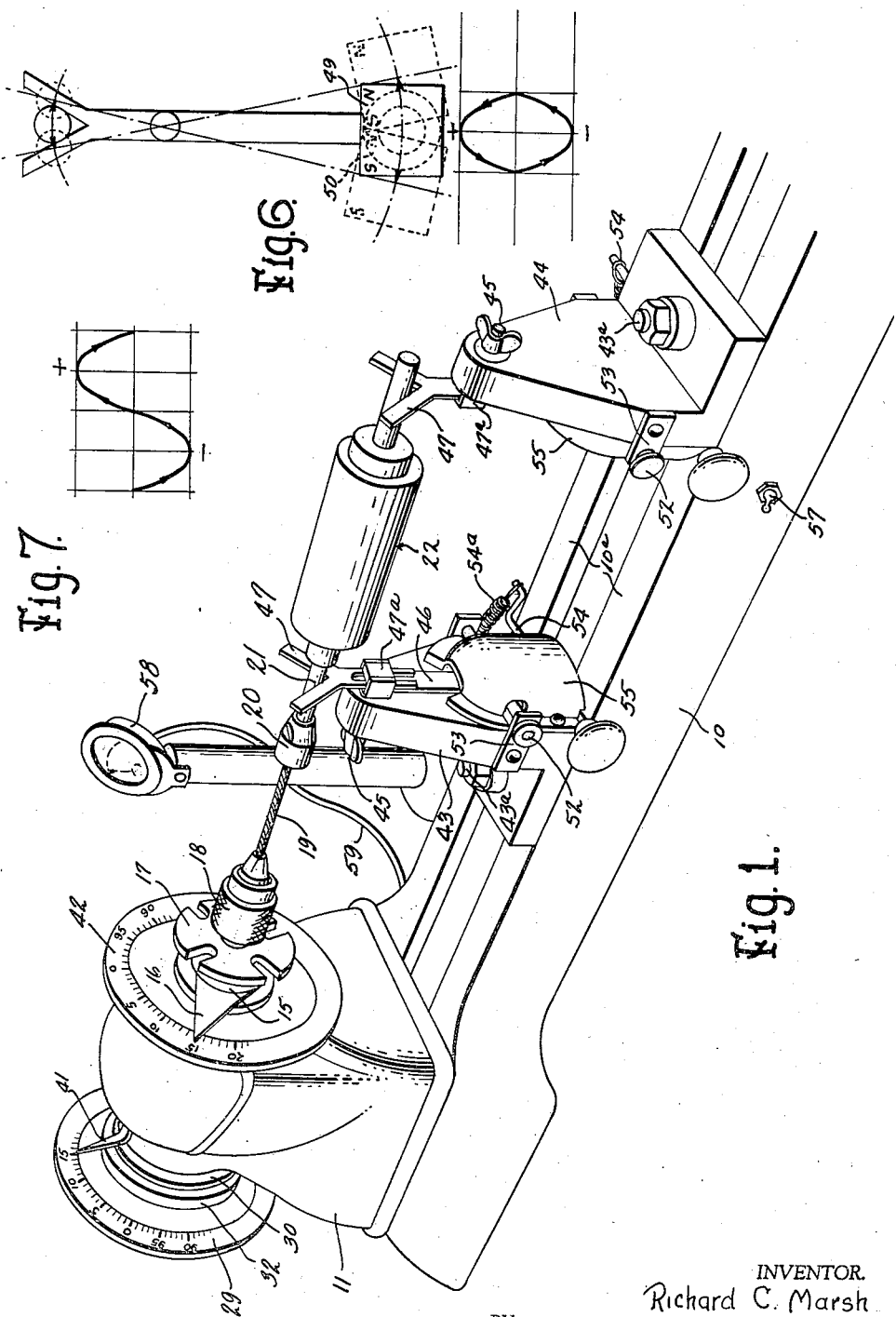
INVENTOR.
Richard C. Marsh
BY Edward M. Apple
Atty.

July 27, 1943.  R. C. MARSH  2,325,144
DYNAMIC BALANCING MACHINE
Filed Dec. 13, 1940  2 Sheets-Sheet 2
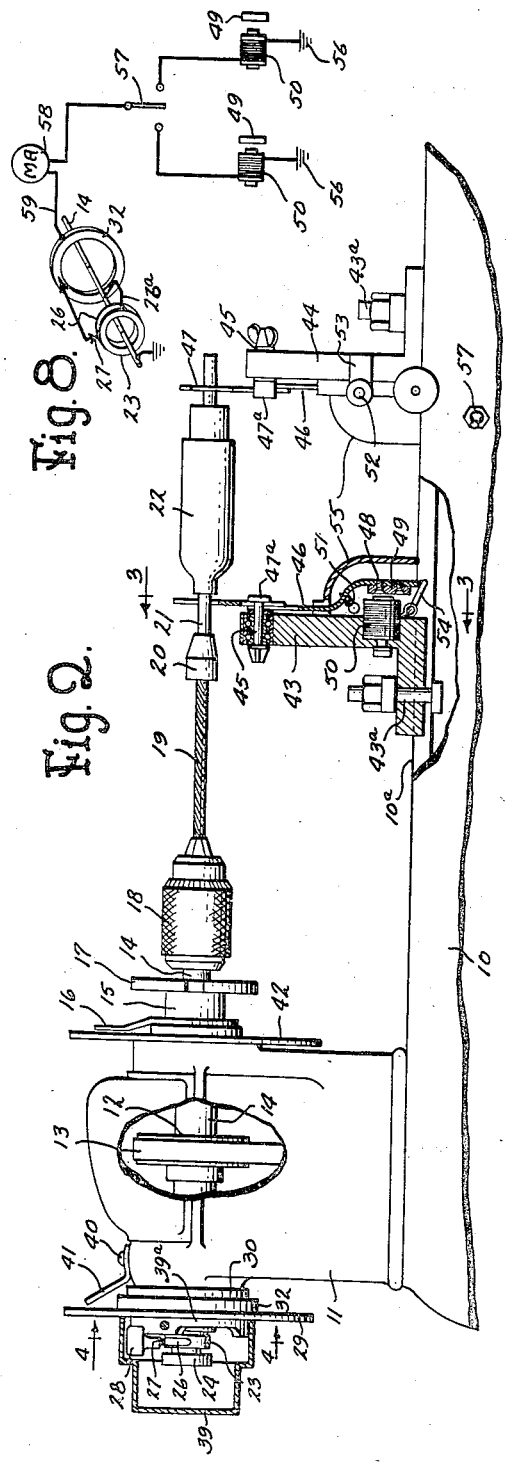
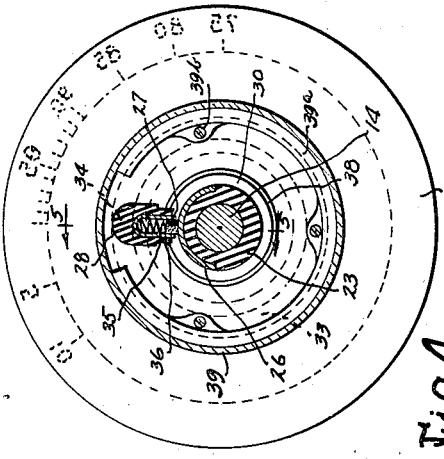
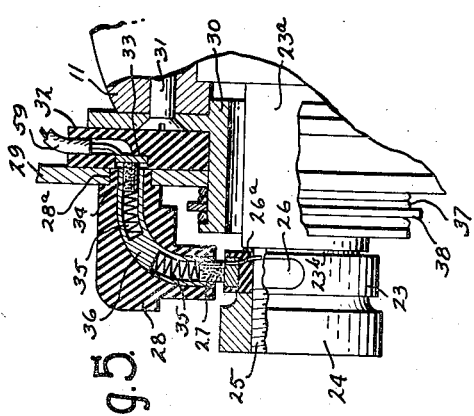
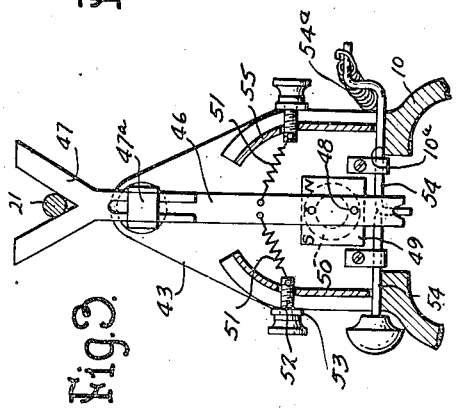
INVENTOR.
Richard C. Marsh
BY Edward M. Apple
Atty.

Patented July 27, 1943

2,325,144

UNITED STATES PATENT OFFICE 2,325,144

DYNAMIC BALANCING MACHINE

Richard C. Marsh, Detroit, Mich.

Application December 13, 1940, Serial No. 369,966

3 Claims. (Cl. 73—53)

This invention relates to dynamic balancing machines and has particular reference to a device which can be used to indicate the circumferential location and exact amount of unbalances in parts such as armatures, rotors, shafts and other rotating members, where accurate balance is required for quiet operation and trouble free service.

An object of the invention is to generally improve devices of the character referred to and to provide a balancing machine which is simple in construction, economical to manufacture and easy to operate.

Devices intended for a similar purpose are now known to the public, but the known devices are invariably complicated and extremely bulky. In many of the known devices their functioning depends upon the vibration or moving of heavy cradles or other parts, in consequence whereof, the results obtained are oftentimes inaccurate. My device is constructed and arranged in such manner that it is necessary to cause the movement only of comparatively small masses in order to obtain the desired results; therefore, the possibility of error creeping in is greatly reduced.

The foregoing and other objects and advantages of the invention will become more apparent as the description proceeds, reference being made from time to time to the accompanying drawings, forming part of the within disclosure, in which:

Fig. 1 is a perspective view of a device embodying my invention.

Fig. 2 is a side elevation of the device illustrated in Fig. 1, partly in section and with parts broken away, to show the relative position of certain parts.

Fig. 3 is a vertical section taken substantially on the line 3—3 of Fig. 2.

Fig. 4 is a view taken substantially on the line 4—4 of Fig. 2.

Fig. 5 is an enlarged fragmentary detail, with parts broken away and partly in section, taken substantially on the line 5—5 of Fig. 4.

Fig. 6 is a diagrammatic view illustrating the swing of one of the pendulums and its associated magnet across a coil and return, whereby an alternating current is generated.

Fig. 7 is a diagrammatic view illustrating the sine curve of the alternating current generated, as illustrated in Fig. 6, and during a complete revolution of the shaft illustrated in Fig. 1.

Fig. 8 is a diagrammatic view illustrating the wiring diagram of the device.

Referring now more particularly to the drawings, it will be understood that in the embodiment of my invention herein disclosed, the reference character 10 indicates the base on which the working parts of the device are mounted, and 11 indicates a housing in which is journaled the pulley 12 (Fig. 2), which is driven by a belt 13 which in turn is driven by a suitable motor, not shown. The pulley 12 is connected to a shaft 14 to which is secured for rotation, the hub 15 upon which is mounted the pointer 16. The hub 15 is secured to the shaft 14 by means of the lock nut 17. Also secured to the shaft 14 is a chuck 18 which is adapted to engage a flexible shaft 19 to which is secured a chuck 20 or other suitable member adapted to engage the shaft 21 of an armature 22 or other member the unbalance of which it is desired to determine.

At the opposite end of the shaft 14, there is mounted for rotation a slip ring 23 (Figs. 2, 4, and 5), which is held in position by a nut 24 which is internally threaded to engage threads 25 formed on the outer end of the shaft 14. The slip ring 23 is held away from the bearing member 23a by means of a spacer 23b.

The slip ring 23 (Figs. 4 and 5) is made of a non-conductive material. Embedded in the outer periphery of the slip ring 23 is a segment 26, made of brass or other conductive material. The segment 26 (Fig. 4) extends approximately 180 degrees around the outer circumference of the slip ring 23. The segment 26 is grounded through the shaft 14, as at 26a (Figs. 5 and 8).

Adapted to ride on the outer periphery of the slip ring 23 and the segment 26 (Figs. 4 and 5) is a brush 27 which is mounted in a non-conductive brush holder 28, which is secured to the finder dial 29 by the reduced portion 28a (Fig. 5). The finder dial 29 is rotatably mounted on a brass hub 30 which is secured to the housing 11 by means of machine screws 31. Also mounted on the hub 30 is a non-conductive collector ring 32 which has a concentric conductive ring 33 inserted in its face adjacent the finder dial 29. The collector ring 32 does not rotate. A second brush 34 is adapted to contact the ring insert 33 at all times. The brush 27 and the brush 34 are spring-backed, as at 35, and are electrically connected through the conductive element 36. The finder dial 29 and the collector ring 32 are held in position on the hub 30 by means of springs 37 and a clip 38. The slip ring 23 and the brush assembly, as just described, are enclosed within a dust cover 39 (Fig. 2), which is press-fitted over the supporting ring 39a, which is secured to the finder dial 29 by screws 39b.

Secured to the top of the housing 11, adjacent the dial 29, by means of a screw 40, is a pointer 41. A second dial 42, which is not rotatable, is secured to the housing 11 by any suitable means. This dial 42 will be referred to as the locating dial and the dial 29, which is manually rotatable, as hereinbefore explained, will be referred to as the finder dial. These dials are calibrated from 0 to 100. The finder dial 29 is calibrated in a clockwise manner and the locating dial 42 is calibrated in a counter-clockwise manner (Fig. 1). This enables us to start with the pointers and dials both set at zero reading and finish with the pointers indicating similar readings on both dials as explained hereinafter.

I will now describe the current generating elements of my device which are supported on L-shaped bearing brackets 43 and 44, which are secured by means of bolts 43a on the ways 10a of the base member 10. The brackets 43 and 44 are adjustable lengthwise of the base 10 in order to accommodate rotatable articles of different lengths. Pivoted to each bracket 43 and 44, as at 45, is a pendulum 46, each pendulum being provided at its upper end with a Y member 47, which is adapted to serve as a bearing for the shaft 21 of the member 22 being tested. The members 47 are vertically adjustable by means of the friction members 47a. At the other end of each pendulum, as at 48, I secure a bar magnet 49. These magnets are adapted to be swung back and forth in front of the coils 50 (Figs. 2 and 3). The pendulums 46 are held in normal vertical position by means of the springs 51, the tension of which springs 51 is adjustable through the members 52 and 53. Each pendulum 46 may be locked against movement by means of the locking rods 54. The locking rods 54 (Figs. 1 and 3) are held in locked and unlocked positions by means of the springs 54a. The bent ends of rods 54 are rocked over center to effect the two positions. The coils and magnets are enclosed within dust covers 55. The coils 50 are grounded, as at 56 (Fig. 8), and are connected to the single pole double throw switch 57, which is in turn electrically connected to the direct current milliammeter 58 which is in turn electrically connected as at 59, to the conductive element 33 of the collector ring 32, which completes an electric circuit through the device, as it will be remembered that the conductive segment 26 of the slip ring 23 is also grounded. The milliammeter is so connected that it will register the positive half of the alternating current cycle. The positive half of the cycle (Figs. 6 and 7) will be referred to as the positive alternation. The polarity of each magnet 49 is such that the positive alternation occurs as the unbalance in the element 22 is traveling around the upper half of the revolution. If there is no unbalance in the element 22 being tested the pendulums will remain in a vertical position.

As the element 22 is rotated on its shaft 21, the centrifugal force caused by any unbalance will cause the pendulum to be moved back and forth. The device is arranged so that one pendulum may be locked out of operation at a time. This enables me to check the unbalance at either end of the element 22 at will.

I prefer to rotate the shaft at a constant speed of 1750 R. P. M. If there is unbalance in the rotating part 22 the unbalance will cause the pendulum, which is in operation, to be moved back and forth causing its magnet to swing past the coil, whereby the magnetic flux induces an alternating current in the coil. The amount of current induced in the coil is governed by the amount of unbalance, as the various distances of travel of the magnet are controlled by the various amounts of unbalance in the part 22, and as the distances of travel must be made in the same length of time due to the constant rotation of the machine, it follows then that the current output of the coil is governed by the speed of the magnetic flux cutting through the coils. The amount of current generated in the coil will be indicated by the milliammeter and will represent exactly the amount of unbalance in the part. Inasmuch as the milliammeter is very sensitive, a very efficient reading indicating the amount of the unbalance will be obtained. The current is carried through the connection 59 to the conductive element 33 of the collector ring 32, from whence it is picked up by the brush 34 and carried to the brush 27 through the conductive element 36. It will be recalled that the slip ring 23 is attached to the shaft 14 and turns with it. It will also be remembered that the slip ring 23 is made of an insulating material except for the brass insert 26 which insures contact with the brush 27 for one-half of each revolution of the slip ring 23. It will also be remembered that the brass insert 26 is grounded to complete the circuit during such time as the brass insert 26 is in contact with the brush 27. The combination just described, constitutes a simple half wave rectifier when the finder dial 29 and the brush holder 28, which is secured thereto, are set in proper position to pick up the positive alternation generated by the movement of the magnet across the coil. If the brush holder 28 is moved one way or the other from that position, the brush will pick up part of the negative alternation causing the hand of the milliammeter to drop sharply. When the finder dial 29, which carries the brush holder 28, is set at the position which indicates the highest reading on the milliammeter 58, it will also indicate the center of the positive alternation and the center of the stroke of the magnet and pendulum. As the stroke of the magnet is in practically perfect timing with the movement of the unbalance in the part 22, the setting of the finder dial 29 will indicate the approximate position of the unbalance in the part 22. This position will be indicated on the finder dial 29 by the pointer 41, as shown in Fig. 1. The machine is then stopped, and the shaft 14 is manually turned until the pointer 16 (Fig. 1) is set at the corresponding reading on the locating dial 42, in which situation the position of the unbalance in the part 22 will be approximately at the top depending upon the degree of time lag between the force and the displacement. The unbalance can then be rectified by adding to or subtracting from the weight of the part 22, at that point. The calibrations on the finder dial 29 and the locating dial 42 run in opposite directions so that an exact reading may be taken without the necessity of making corrections which would be necessary if the calibrations on both dials read in the same direction, for it will be remembered that the centrifugal force caused by the rotation of the unbalanced part causes the bearing member 47 to move in one direction, which causes the magnet 49 to swing in the opposite direction.

When the machine is assembled, the dial 29 is set so that the pointer 41 is at zero, and the pointer 16 is set so that it is on zero on the dial 42. In this position the brush 27 is then in the exact center of the segment 26 of the slip ring 23 and the machine is now ready for operation.

To operate the machine, a part 22 is then placed on the bearings and connected to the shaft 14. This set up of the machine is permanent and thereafter the pointer 16 is always in alignment with the center of the contact segment 26. The device is then rotated at 1750 R. P. M. The finder dial 29 is then moved until the milliammeter registers its highest reading. This will indicate the amount of unbalance, that is, whether great or little, and will also indicate the center of the positive alternation, and the center of the stroke of the magnet and pendulum. In the example shown in Fig. 1, the finder dial 29 indicates that the unbalance is 15 points from zero. The machine is then stopped and the pointer 16, which rotates with the shaft 14 and the part 22, is moved so that it indicates 15 points from zero on the locating dial 42. Because of the previous positions of the relative parts, we then know that the location of the unbalance is at the top of the part 22. The operation for testing either longitudinal half of the part is the same, one end being tested at a time.

Although I have shown a preferred embodiment of my invention, it will be understood that certain modifications may be made, all of which are within the scope of the appended claims.

Having described my invention, what I claim and desire to secure by Letters Patent is:

1. In a balancing machine of the character described, including means for rotating a member to be balanced, and means for electrically indicating the amount of unbalance, the combination of a fixed base, adjustable brackets carried by said base, a pendulum pivoted intermediate its ends to each bracket, a V shaped bearing member at the upper end of each pendulum, a magnet on the lower end of each pendulum, and a coil on each bracket adjacent the plane of travel of a magnet, said coils being electrically connected to said first named electric indicating means.

2. The combination defined in claim 1, in which the V shaped bearing members are longitudinally adjustable on said pendulums.

3. The combination defined in claim 1 including locking means adapted to prevent the movement of said pendulums, said locking means consisting of spring actuated arms arranged to contact said pendulums.

RICHARD C. MARSH.